Feb. 6, 1923.

A. D. MAURY.
FIXED LINE PROTECTOR FOR FISHING REELS.
FILED JULY 12, 1920.

1,444,201.

INVENTOR.
Alfred D. Maury
BY
Thomas L. Wilder
ATTORNEY.

Patented Feb. 6, 1923.

1,444,201

UNITED STATES PATENT OFFICE.

ALFRED D. MAURY, OF ILION, NEW YORK, ASSIGNOR TO MARTIN AUTOMATIC FISHING REEL COMPANY, OF MOHAWK, NEW YORK, A CORPORATION OF NEW YORK.

FIXED LINE PROTECTOR FOR FISHING REELS.

Application filed July 12, 1920. Serial No. 395,599.

*To all whom it may concern:*

Be it known that I, ALFRED D. MAURY, a citizen of the United States, residing at Ilion, in the county of Herkimer and State of New York, have invented certain new and useful Improvements in Fixed Line Protectors for Fishing Reels, of which the following is a specification, reference being had therein to the accompanying drawing.

My invention relates to a fixed line protector for fishing reels, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a device that can be applied readily to any well known make of fishing reels and by becoming a part thereof furnish a fixed line protector for the fishing line.

The fishing reel here illustrated shows only such parts thereof, as are necessary to explain my invention, which will be understood by referring to the drawings, in which.

Figure 1:
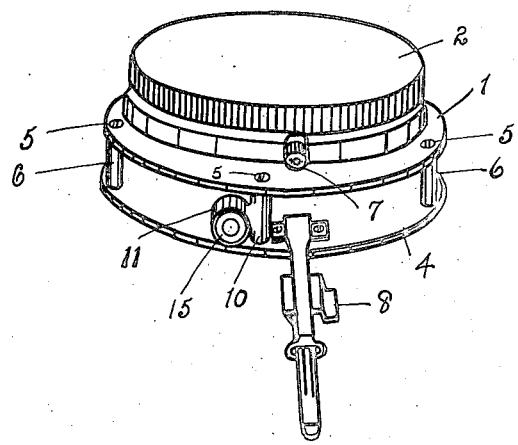
Fig. 1 is a perspective view of a fishing reel showing the fixed line protector attached thereto.
Figure 2:
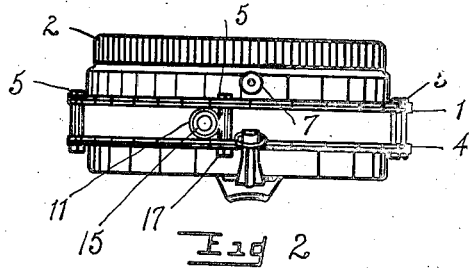
Fig. 2 is a side elevation of the fishing reel showing the attachment.
Figure 3:
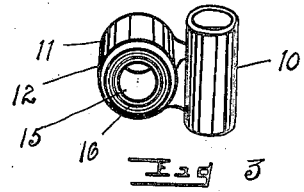
Fig. 3 is an enlarged detail view, showing the fixed line protector that is employed.

Referring more particularly to the drawings, the fishing reel here shown embodies the upper stationary disk —1— in which revolves the rotary disk 2 adapted for winding the spring that rotates the reel, in the usual well known manner. The lower stationary disk 4 is held in place by headed bolts 5 that are surrounded by the hollow sleeves 6 which act as spacers.

In order to apply the attachment for such or similar make of reels, it is necessary to remove only one of the old headed bolts 5 and sleeves 6, preferably the one located near the plunger release 7 or release 8 and substitute the new sleeve 10 of my invention. The new sleeve 10 will perform the same functions, as those performed by the sleeve 6 that is removed and in addition thereto protect the line, as it moves in and out of the reel.

For the purpose of protecting the line, the sleeve 10 has attached the protector 11 which embodies a metallic ring 12 formed integral with the sleeve 10. Disposed within the ring 12 and concentric thereto is a glass or agate ring 15 with rounded edges 16—16 adapted to permit the line to slide smoothly therethrough in either direction without injury.

The glass or agate ring 15 is held within the metallic ring 12 by cement or by a close fit of said glass ring 15 to said metallic ring 12 or in any other suitable manner.

The sleeve 10 is held in place by a headed bolt 5 and nut 17.

It will be apparent from the foregoing, that this fixed line protector can be attached easily to any well known make of fishing reel.

Having thus described my invention what I claim as new and desire to secure by Letters Patent is:

1. In a fixed line protector for fishing reels, having upper and lower disks, a sleeve adapted to act as a spacer for said disks, a ring formed integral with said sleeve, and a glass ring within said first named ring, whereby to protect a fishing line.

2. In a fixed line protector for fishing reels having upper and lower disks, a sleeve adapted to act as a spacer for said disks, a ring formed integral with said sleeve, a glass ring mounted within said first named ring, and the edges of said glass ring being rounded, whereby to permit a fishing line to slide smoothly through said ring.

3. In a fixed line protector for fishing reels having upper and lower disks, a sleeve adapted to act as a spacer for said disks, a ring attached to said sleeve, and a glass ring having rounded edges, mounted within and concentric to said first named ring, whereby to permit a fishing line to slide smoothly through said ring.

4. In a fixed line protector for fishing reels, having upper and lower stationary disks, a sleeve adapted to act as a spacer for said disks, a ring formed integral with said sleeve, and a glass ring having rounded edges mounted within said first named ring, whereby to permit a fishing line to slide smoothly through said ring.

In testimony whereof I have affixed my signature.

ALFRED D. MAURY.

Witnesses:
J. E. RAFTER,
CHARLES E. MAURICE.